United States Patent
Wang et al.

(10) Patent No.: US 11,526,285 B2
(45) Date of Patent: Dec. 13, 2022

(54) MEMORY DEVICE FOR NEURAL NETWORKS

(71) Applicant: MACRONIX INTERNATIONAL CO., LTD., Hsinchu (TW)

(72) Inventors: Wei-Chen Wang, Taipei (TW); Hung-Sheng Chang, Taipei (TW); Chien-Chung Ho, Chiayi County (TW); Yuan-Hao Chang, Taipei (TW); Tei-Wei Kuo, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 672 days.

(21) Appl. No.: 16/564,066

(22) Filed: Sep. 9, 2019

(65) Prior Publication Data
US 2020/0319808 A1   Oct. 8, 2020

Related U.S. Application Data

(60) Provisional application No. 62/828,494, filed on Apr. 3, 2019.

(51) Int. Cl.
*G06F 3/06* (2006.01)
*G06N 3/04* (2006.01)

(52) U.S. Cl.
CPC .......... *G06F 3/0631* (2013.01); *G06F 3/0604* (2013.01); *G06F 3/0673* (2013.01); *G06N 3/0454* (2013.01)

(58) Field of Classification Search
CPC .... G06F 3/0604; G06F 3/0631; G06F 3/0673; G06N 3/0454
See application file for complete search history.

(56) References Cited

U.S. PATENT DOCUMENTS

| | | | | |
|---|---|---|---|---|
| 10,360,971 | B1 * | 7/2019 | Hokenmaier | G11C 11/54 |
| 2019/0244086 | A1 * | 8/2019 | Franca-Neto | G06N 3/0445 |
| 2019/0332459 | A1 * | 10/2019 | Schie | G06N 3/0481 |

\* cited by examiner

*Primary Examiner* — Eric T Oberly
(74) *Attorney, Agent, or Firm* — McClure, Qualey & Rodack, LLP

(57) ABSTRACT

A memory device includes: a memory array used for implementing neural networks (NN), the NN including a plurality of layers; and a controller coupled to the memory array, the controller being configured for: determining a computation duration of a first data of a first layer of the plurality of layers; selecting a first program operation if the computation duration of the first data of the first layer is shorter than a threshold; and selecting a second program operation if the computation duration of the first data of the first layer is longer than the threshold, wherein the second program operation has a longer program pulse time than the first program operation.

17 Claims, 10 Drawing Sheets

FIG. 3A

| Layer | AM CD array | | RS |  |
|---|---|---|---|---|
| Layer 10 | 0.171 | 0.108 | RS1 | RS1 |
| Layer 9 | | | | |
| Layer 8 | | | | |
| Layer 7 | ⋮ | ⋮ | ⋮ | ⋮ |
| Layer 6 | | | | |
| Layer 5 | | | | |
| Layer 4 | | | | |
| Layer 3 | 1.765 | 1.308 | RS1 | RS1 |
| Layer 2 | | | | |
| Layer 1 | 1.961 | | RS1 | |

FIG. 3B

| Layer | AM CD array | | RS |  |
|---|---|---|---|---|
| Layer 10 | 0.713 | 0.422 | RS1 | RS1 |
| Layer 9 | | | | |
| Layer 8 | | | | |
| Layer 7 | ⋮ | ⋮ | ⋮ | ⋮ |
| Layer 6 | | | | |
| Layer 5 | | | | |
| Layer 4 | | | | |
| Layer 3 | 4.902 | 3.891 | RS2 | RS1 |
| Layer 2 | | | | |
| Layer 1 | 5.417 | | RS2 | |

AM CD array: (for each layer)

| Layer 10 | 1.013 | RS1 |
| Layer 9 | 1.267 | RS1 |
| Layer 8 | | |
| Layer 7 | ⋮ | ⋮ |
| Layer 6 | | |
| Layer 5 | | |
| Layer 4 | 3.891 | |
| Layer 3 | 6.814 | RS2 |
| Layer 2 | 7.102 | RS2 |
| Layer 1 | 8.574 | RS3 |

AM CD array: (for each layer)

FIG. 3C

| Layer 10 | 0.108 | RS1 |
| Layer 9 | 0.171 | RS1 |
| Layer 8 | | |
| Layer 7 | | |
| Layer 6 | ... | ... |
| Layer 5 | | |
| Layer 4 | | |
| Layer 3 | 1.308 | RS1 |
| Layer 2 | 1.765 | RS1 |
| Layer 1 | 1.961 | RS1 |

AM CD array: (for each layer)

FIG. 4A

MEMORY DEVICE FOR NEURAL NETWORKS

CROSS-REFERENCE TO RELATED ART

This application claims the benefit of U.S. provisional application Ser. No. 62/828,494, filed Apr. 3, 2019, the subject matter of which is incorporated herein by reference.

TECHNICAL FIELD

The disclosure relates in general to a memory device.

BACKGROUND

In recent years, neural networks (NN) or Artificial neural networks (ANN) become a popular solution in artificial intelligence area.

For example, in image recognition, ANN or NN might learn to identify images that contain cats by analyzing example images that have been manually labeled as "cat" and using the results to identify cats in other images. ANNs or NNs automatically generate identifying characteristics from the learning material that they process.

ANNs or NNs have been used on a variety of tasks, including image recognition, speech processing, computer vision, speech recognition, machine translation, social network filtering, playing board and video games and medical diagnosis. However, the growing model size of neural network especially in training phase becomes an issue.

FIG. 1 shows a diagram for NN training. NN training needs a plurality of iterations each including a forward propagation and a backward propagation. As shown in FIG. 1, NNs have two types of data, for example, (1) activation maps (AM) or "input and intermediate data" or feature maps (FM); and (2) Weights and biases (WB). AMs and WBs have different diverse computation durations. AM in deeper layers have shorter computation durations. AM in shallower layers have longer computation durations. Weights and biases in all layers have the longest computation durations. The term "computation duration" means the time duration of the data of a layer needed to be maintained or in the valid state.

AM_CD1 represents the computation duration (CD) of the AM of layer 4; AM_CD2 represents the computation duration of the AM of layer 8 (AM_CD1 is longer than AM_CD2); and WB_CD represents the computation duration of the weight and biases (WB) of layer 8. The data relationship of activation maps is inner-iteration and the data relationship of weights and biases is outer-iteration. In the forward propagation of each iteration of each layer, sum of product operations are performed on the WB and the layer input to produce the activation maps of each layer. In the backward propagation of each iteration of each layer, the produced activation maps are used to update the weights and biases.

Meanwhile, there are several issues when DRAMs are used as main memories for neural networks. The price of DRAM is high; DRAM confronts scaling difficulty; the memory density of DRAM is not large enough; and leakage power is another significant problem for DRAM.

As a result, phase-change memory (PCM) is proposed as an alternative main memory device for neural networks. Compared with DRAM, the price of PCM is low; PCM has not confronted scaling difficulty; the memory density of PCM is large; and PCM has no leakage power issue.

Although PCM has numerous advantages as mentioned above. However, PCM is a non-volatile memory, which means PCM might be worse than DRAM in several characteristics, including: low write performance, high energy consumption and low endurance.

Thus, the application provides a memory device for solving the above or other similar problems.

SUMMARY

According to one embodiment, provided is a memory device including: a memory array used for implementing neural networks (NN), the NN including a plurality of layers; and a controller coupled to the memory array, the controller being configured for: determining a computation duration of a first data of a first layer of the plurality of layers; selecting a first program operation if the computation duration of the first data of the first layer is shorter than a threshold; and selecting a second program operation if the computation duration of the first data of the first layer is longer than the threshold, wherein the second program operation has a longer program pulse time than the first program operation.

According to another embodiment, provided is a memory device including: a memory array used for implementing neural networks (NN), the NN including a plurality of layers; and a controller coupled to the memory array, the controller being configured for: determining a computation duration of a first data of a first layer of the plurality of layers: selecting a first program operation if the computation duration of the first data of the first layer is shorter than a threshold; and periodically refreshing the first data of the first layer by the first program operation if the computation duration of the first data of the first layer is longer than the threshold.

According to yet another embodiment, provided is a memory device including: a memory array used for implementing neural networks (NN), the NN including a plurality of layers: and a controller coupled to the memory array, the controller being configured for: selecting and performing a first program operation on a first group of a first data of a first layer of the plurality of layers; and selecting and performing a second program operation on a second group of the first data, wherein the first program operation has a program pulse time longer than the second program operation; and the first group of the first data has bit importance higher than the second group of the first data.

BRIEF DESCRIPTION OF THE DRAWINGS

FIG. 3A-FIG. 3C show several examples of mechanism one of adaptive NN Layer-aware set operation according to one embodiment of the application.

FIG. 4A-FIG. 4C show several examples of mechanism two of adaptive NN Layer-aware set operation according to one embodiment of the application.

Figure 1:
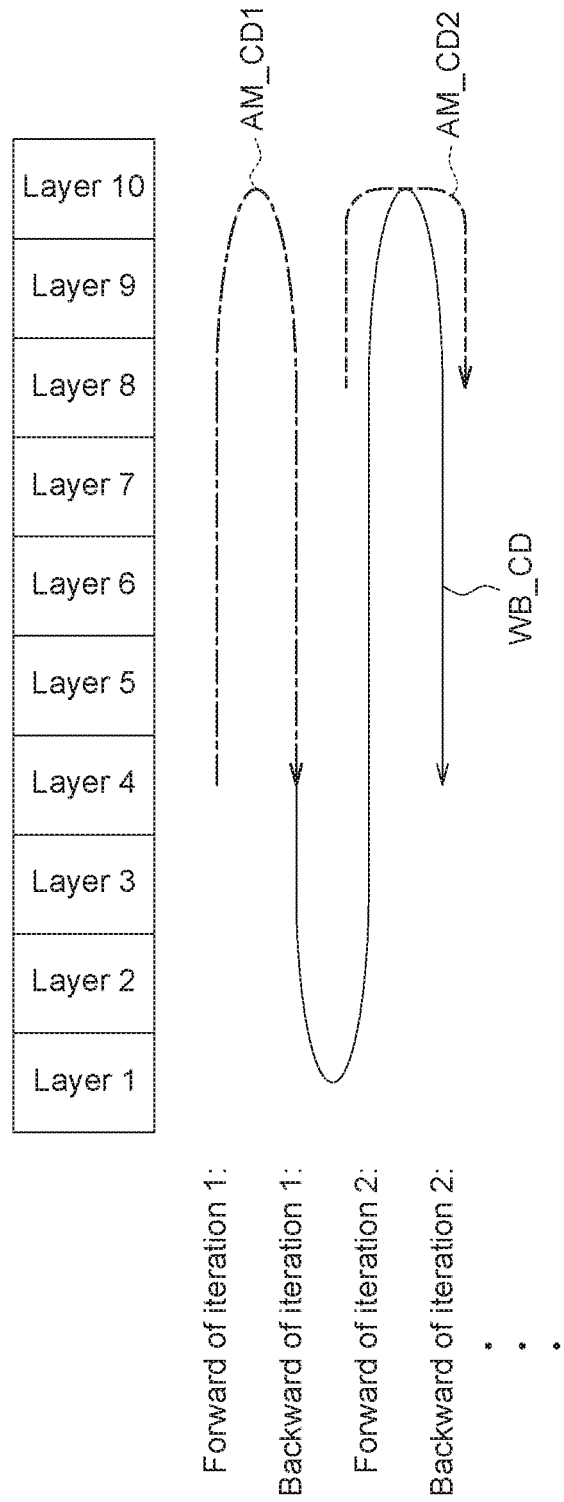
FIG. 1 (PRIOR ART) shows a diagram for NN training.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 2:
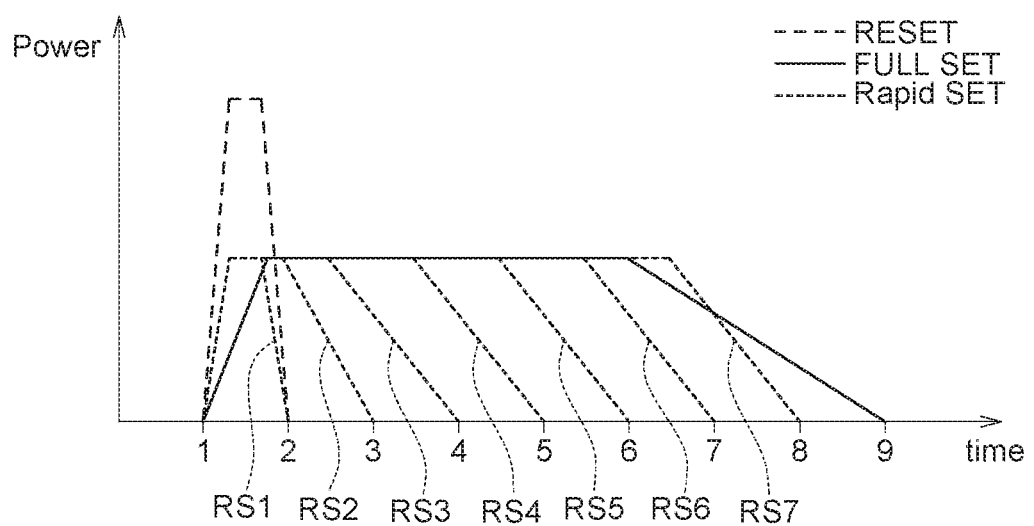
FIG. 2 shows programming operations according to one embodiment of the application.

FIG. 2 shows programming operations according to one embodiment of the application. As shown in FIG. 2, programming operations include: reset operations, full set operations (or called "set operations") and rapid set operations.

The reset operations are used to reset the memory cells as logic 0. Both the full set operations and the rapid set operations are used to set the memory cells as logic 1.

The reset operation has an enabled duration (or said program pulse time) of 1 unit time. If the set operation has longer enabled duration (or said program pulse time), then the retention time achieved by the set operation having longer enabled duration is longer, and vice versa. In the embodiment of the application, there are several types of rapid set operations, for example but not limited by, including "rapid set 1 (RS1)" operation, "rapid set 2 (RS2)" operation, "rapid set 3 (RS3)" operation, "rapid set 4 (RS4)" operation, "rapid set 5 (RS5)" operation, "rapid set 6 (RS6)" operation and "rapid set 7 (RS7)" operation. The "rapid set 1 (RS1)" operation has an enabled duration of 1 unit time and the retention time achieved by the "rapid set 1 (RS1)" operation is for example but not limited by about 4 seconds. The "rapid set 2 (RS2)" operation has an enabled duration of 2 unit time and the retention time achieved by the "rapid set 2 (RS2)" operation is for example but not limited by about 8 seconds. The "rapid set (RS3)" operation has an enabled duration of 3 unit time and the retention time achieved by the "rapid set 3 (RS3)" operation is for example but not limited by about 12 seconds. The "rapid set 4 (RS4)" operation has an enabled duration of 4 unit time and the retention time achieved by the "rapid set 4 (RS4)" operation is for example but not limited by about 16 seconds. The "rapid set 5 (RS5)" operation has an enabled duration of 5 unit time and the retention time achieved by the "rapid set 5 (RS5)" operation is for example but not limited by about 20 seconds. The "rapid set 6 (RS6)" operation has an enabled duration of 6 unit time and the retention time achieved by the "rapid set 6 (RS6)" operation is for example but not limited by about 24 seconds. The "rapid set 7 (RS7)" operation has an enabled duration of 7 unit time and the retention time achieved by the "rapid set 7 (RS7)" operation is for example but not limited by about 28 seconds. The full set operation has an enabled duration of 8 unit time and the retention time achieved by the full set operation is for example but not limited by about years. That is, the "rapid set 1 (RS1)" operation has a shortest program pulse time while the full set operation has a longest program pulse time.

Adaptive NN Layer-Aware Set Operation

In one embodiment of the application, adaptive NN layer-aware set operations are used to explore the data flow of neural network, to modulate different (rapid) set duration according to different computation duration in each NN layer; and to modulate program pulse time and data retention time according to the result of former iteration.

In the application, an AM CD array is utilized to record the computation duration of each layer. In the AM CD array, the max AM CD of each layer is stored. Further, the max AM CD between the forward propagation and the backward propagation in the same iteration is stored in the AM CD array. The AM CD array is updated in each of the iterations in training phase. The CD could be acquired by measuring neural network in the first iteration.

In implementing the adaptive NN layer-aware set operation, before the training iterations, the memory device is profiled to get the characteristic (i.e., the relationship between rapid set operations and data retention time). For example, profiling of the memory device is achieved by programming all activation maps in all layers by the rapid set operation (for example, the "rapid set 1 (RS1)" operation) to verify the retention time.

In the application, there are two possible mechanisms to implement the Adaptive NN Layer-aware set operation.

Mechanism one of the Adaptive NN Layer-aware set operation

In the mechanism one of the Adaptive NN Layer-aware set operation, the program pulse time of the set operations are determined according to computation duration.

As described above, if the set operation has longer enabled duration (or said program pulse time), then the retention time achieved by the set operation having longer enabled duration is longer, and vice versa. Thus, in the mechanism one of the adaptive NN layer-aware set operation of the embodiment of the application, the set operation is selected among the "rapid set 1 (RS1)" operation, the "rapid set 2 (RS2)", . . . , the "rapid set 7 (RS7)" operation and the full set operation based on the desired retention time. Further, the desired retention time is also based on the CD of the data of the NN (or said the desired retention time has to be longer than the CD of the data of the NN). For example, if the CD of the data of the NN is CD=7.183 seconds, then the "rapid set 2 (RS2)" operation is selected because the retention time achieved by the "rapid set 2 (RS2)" operation is 8 seconds, which is longer than the CD of the data of the NN.

FIG. 3A-FIG. 3C show several examples of mechanism one of adaptive NN Layer-aware set operation according to one embodiment of the application.

As shown in FIG. 3A, in the AM CD array, the computation durations of the activation maps of layer 1 to layer 10 are 1.961, 1.765, 1.308, . . . , 0.171 and 0.108, respectively. Then, the "rapid set 1 (RS1)" operation is selected to program the activation maps of layer 1 to layer 10 because the computation duration of the activation maps of layer 1 to layer 10 are shorter than 4 seconds. That is, it will be a waste to select "rapid set 2 (RS2)" operation, . . . , and full set operation in programming the activation maps of layer 1 to layer 10 in FIG. 3A which have the computation duration shorter than 4 seconds.

As shown in FIG. 3B, in the AM CD array, the computation durations of the activation maps of layer 1 to layer 10 are 5.417, 4.902, 3.891, . . . , 0.713 and 0.422, respectively. The "rapid set 2 (RS2)" operation is selected to program the activation maps of layer 1 and layer 2 because the computation duration of the activation maps of layer 1 and layer 2 are longer than 4 seconds but shorter than 8 seconds. The "rapid set 1 (RS1)" operation is selected to program the activation maps of layer 3 to layer 10 because the computation duration of the activation maps of layer 3 to layer 10 are shorter than 4 seconds. That is, in programming the activation maps of layer 1 and layer 2 which have the computation duration longer than 4 seconds but shorter than 8 seconds, the "rapid set 2 (RS2)" operation is a suitable selection (because the retention time caused by the "rapid set 2 (RS2)" operation is 8 seconds). Similarly, in programming the activation maps of layer 3 to layer 10 which have the computation duration shorter than 4 seconds, the "rapid set 1 (RS1)" operation is a suitable selection (because the retention time caused by the "rapid set 1 (RS1)" operation is 4 seconds).

As shown in FIG. 3C, in the AM CD array, the computation durations of the activation maps of layer 1 to layer 10 are 8.574, 7.102, 6.814, 3.891, . . . , 1.267 and 1.013, respectively. The "rapid set 3 (RS3)" operation is selected to program the activation maps of layer 1 because the computation duration of the activation maps of layer 1 are longer than 8 seconds but shorter than 12 seconds. The "rapid set 2 (RS2)" operation is selected to program the activation maps of layer 2 and layer 3 because the computation duration of the activation maps of layer 2 and layer 3 are longer than 4 seconds but shorter than 8 seconds. The "rapid set 1 (RS1)" operation is selected to program the activation maps of layer 4 to layer 10 because the computation duration of the activation maps of layer 4 to layer 10 are shorter than 4 seconds. That is, in programming the activation maps of layer 1 which have the computation duration longer than 8 seconds but shorter than 12 seconds, the "rapid set 3 (RS3)" operation is a suitable selection (because the retention time caused by the "rapid set 3 (RS3)" operation is 12 seconds). In programming the activation maps of layer 2 and layer 3 which have the computation duration longer than 4 seconds but shorter than 8 seconds, the "rapid set 2 (RS2)" operation is a suitable selection (because the retention time caused by the "rapid set 2 (RS2)" operation is 8 seconds). In programming the activation maps of layer 4 to layer 10 which have the computation duration shorter than 4 seconds, the "rapid set 1 (RS1)" operation is a suitable selection (because the retention time caused by the "rapid set 1 (RS1)" operation is 4 seconds).

Mechanism two of the Adaptive NN Layer-aware set operation

In mechanism two of the adaptive NN layer-aware set operation, the activation maps of all layers are programmed by the "rapid set 1 (RS1)" operation, but the activation maps whose computation duration exceeds the threshold are refreshed periodically.

Figure 4B:
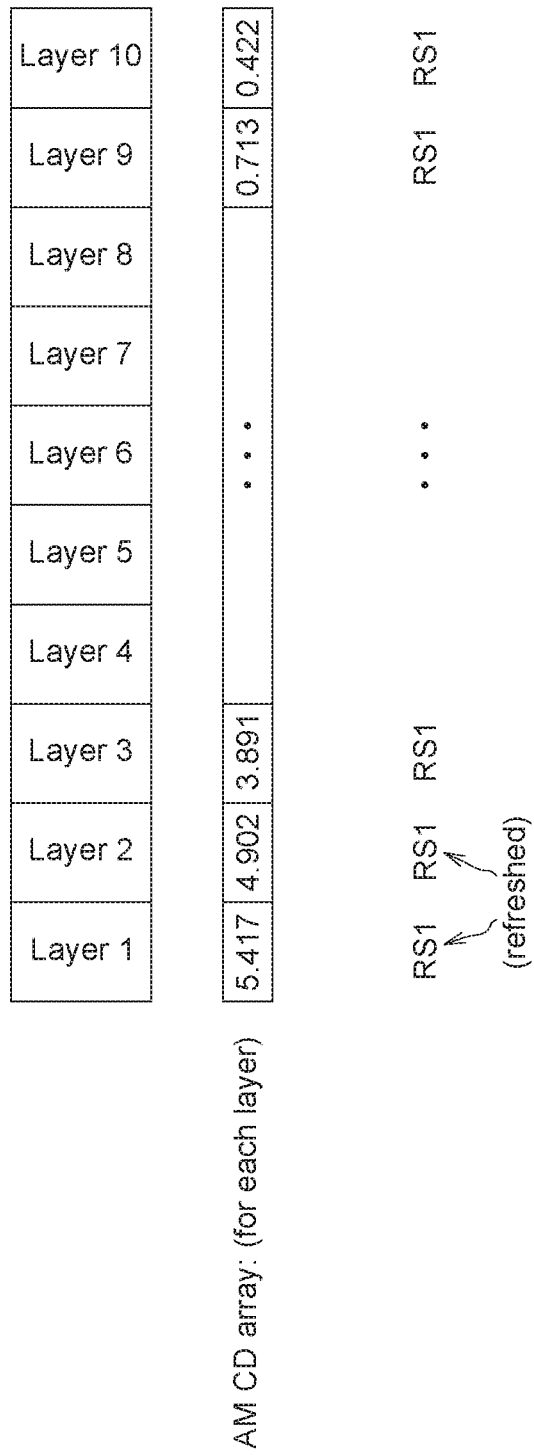
Figure 4C:

FIG. 4A-FIG. 4C show several examples of mechanism two of adaptive NN Layer-aware set operation according to one embodiment of the application.

As shown in FIG. 4A, in the AM CD array, the computation durations of the activation maps of layer 1 to layer 10 are 1.961, 1.765, 1.308, . . . , 0.171 and 0.108, respectively. Then, the "rapid set 1 (RS1)" operation is selected to program the activation maps of layer 1 to layer 10 because the computation duration of the activation maps of layer 1 to layer 10 are shorter than 4 seconds. However, there is no need to refresh the activation maps of layer 1 to layer 10 because the computation duration of the activation maps of layer 1 to layer 10 are shorter than 4 seconds.

As shown in FIG. 4B, in the AM CD array, the computation durations of the activation maps of layer 1 to layer 10 are 5.417, 4.902, 3.891, . . . , 0.713 and 0.422, respectively. The "rapid set 1 (RS1)" operation is selected to program the activation maps of layer 1 to layer 10. However, the activation maps of layer 1 and layer 2 need to be refreshed (for example every 4 seconds) because the computation duration of the activation maps of layer 1 and layer 2 are longer than 4 seconds (in this example, the threshold is 4 seconds).

As shown in FIG. 4C, in the AM CD array, the computation durations of the activation maps of layer 1 to layer 10 are 8.574, 7.102, 6.814, 3.891, . . . , 1.267 and 1.013, respectively. The "rapid set 1 (RS1)" operation is selected to program the activation maps of layer 1 to layer 10. Further, the activation maps of layer 1 to layer 3 need to be refreshed every 4 seconds because the computation duration of the activation maps of layer 1 to layer 3 are longer than 4 seconds.

Further, in the first iteration, the full set operation is operated on the activation maps of all layers to obtain computation duration of all activation maps in all layers. After the first iteration, in mechanism one, the rapid set operation is selected based on the AM CD array; and in mechanism two, the activation maps whose computation duration is longer than the threshold are refreshed periodically by the "rapid set 1 (RS1)" operation (or said, the rapid set operation having shortest enabled duration).

The mechanism of data storage in the memory device is explained. Important bits of WB and less important bits of WB are separated; and different set operations are operated on the important bits of WB and the less important bits of WB.

For explanation, WB having 32-bit floating point is taken as an example, but the application is not limited by. In usual, 32-bit floating point includes: 1-bit sign bit, 8-bit exponent bit and 23-bit mantissa bit. In writing the 32-bit floating point, the full set operation is selected to perform on the sign bit, the exponent bit and the first few mantissa bits (i.e. Most Significant Bits, MSB) of the mantissa bit. That is, the sign bit, the exponent bit and the MSB of the mantissa bit are referred as the important bits of the WB. With the support of Data-Comparison Write (DCW), the important bits of the WB are programmed only when the important bit(s) of the WB is/are changed.

On the contrary, other mantissa bits (i.e. Least Significant Bits, LSB) of the mantissa bit are programmed by the rapid set operation (for example, the RS1 operation). That is, the LSB of the mantissa bit are referred as the less important bits of the WB.

Figure 5A:
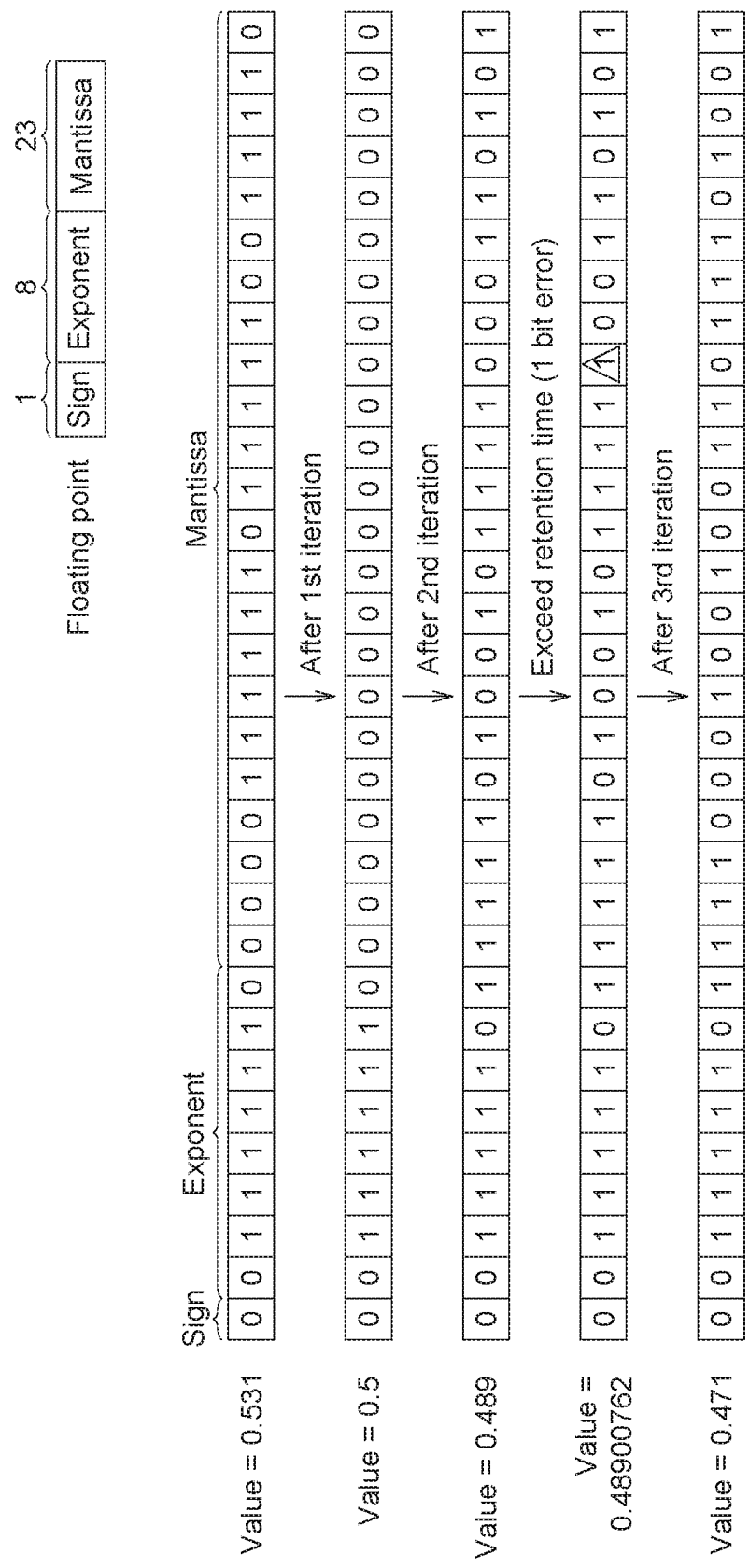
FIG. 5A and FIG. 5B show fluctuation of bit which exceeds the retention time.

FIG. 5A shows fluctuation of bit which exceeds the retention time. At initial, the value of the 32-bit floating point is 0.531. After the first iteration, the value of the 32-bit floating point is 0.5. Similarly, after the second iteration, the value of the 32-bit floating point is 0.489. However, one LSB (for example bit 15) of the mantissa bit is fluctuated due to exceeding of the retention time and thus the value of the 32-bit floating point becomes 0.48900762. The fluctuated bit may be recovered in the following training iterations. After the third iteration, the value of the 32-bit floating point is 0.471. Thus, it is clear that even if the LSB of the mantissa bit have fluctuation due to exceeding of the retention time, the value of the 32-bit floating point before an error occurred is slightly different from the value of the 32-bit floating point after the error occurred.

WB having "32-bit unsigned fixed point" is taken as another example, but the application is not limited by. In usual, 32-bit unsigned fixed point includes: 1-bit integer bit and 31-bit fraction bit. In writing the 32-bit unsigned fixed point, the full set operation is selected to perform on the integer bit and the first few fraction bits (i.e. Most Significant Bits) of the fraction bit. That is, the integer bit and the MSB of the fraction bit are referred as the important bits of the WB. On the contrary, other bits (i.e. Least Significant Bits) of the fraction bit are programmed by the rapid set operation (for example, the RS1 operation). That is, the LSB of the fraction bit are referred as the less important bits of the WB.

Also, the integer bit and the first few fraction bits (i.e. Most Significant Bits) of the fraction bits of the unsigned fixed point are re-programmed (by the full set operation) only when the bits need to be changed. The LSB of the fraction bits of the unsigned fixed point is re-programmed by the rapid set operation in every iteration in the training phase.

WB having "32-bit signed fixed point" is taken as another example, but the application is not limited by. In usual, 32-bit signed fixed point includes: 1-bit sign bit, 1-bit integer bit and 30-bit fraction bit. In writing the 32-bit signed fixed point, the full set operation is selected to perform on the sign bit, the integer bit and the first few fraction bits (i.e. Most Significant Bits) of the fraction bit. That is, the sign bit, the integer bit and the MSB of the fraction bit are referred as the important bits of the WB. On the contrary, other bits (i.e. Least Significant Bits) of the fraction bit are programmed by the rapid set operation (for example, the RS1 operation). That is, the LSB of the fraction bit are referred as the less important bits of the WB.

Also, the sign bit, the integer bit and the first few bits (i.e. Most Significant Bits) of the fraction bits of the signed fixed point are re-programmed (by the full set operation) only when the bits need to be changed. The LSB of the fraction bits of the signed fixed point is re-programmed by the rapid set operation in every iteration in the training phase.

Figure 5B:
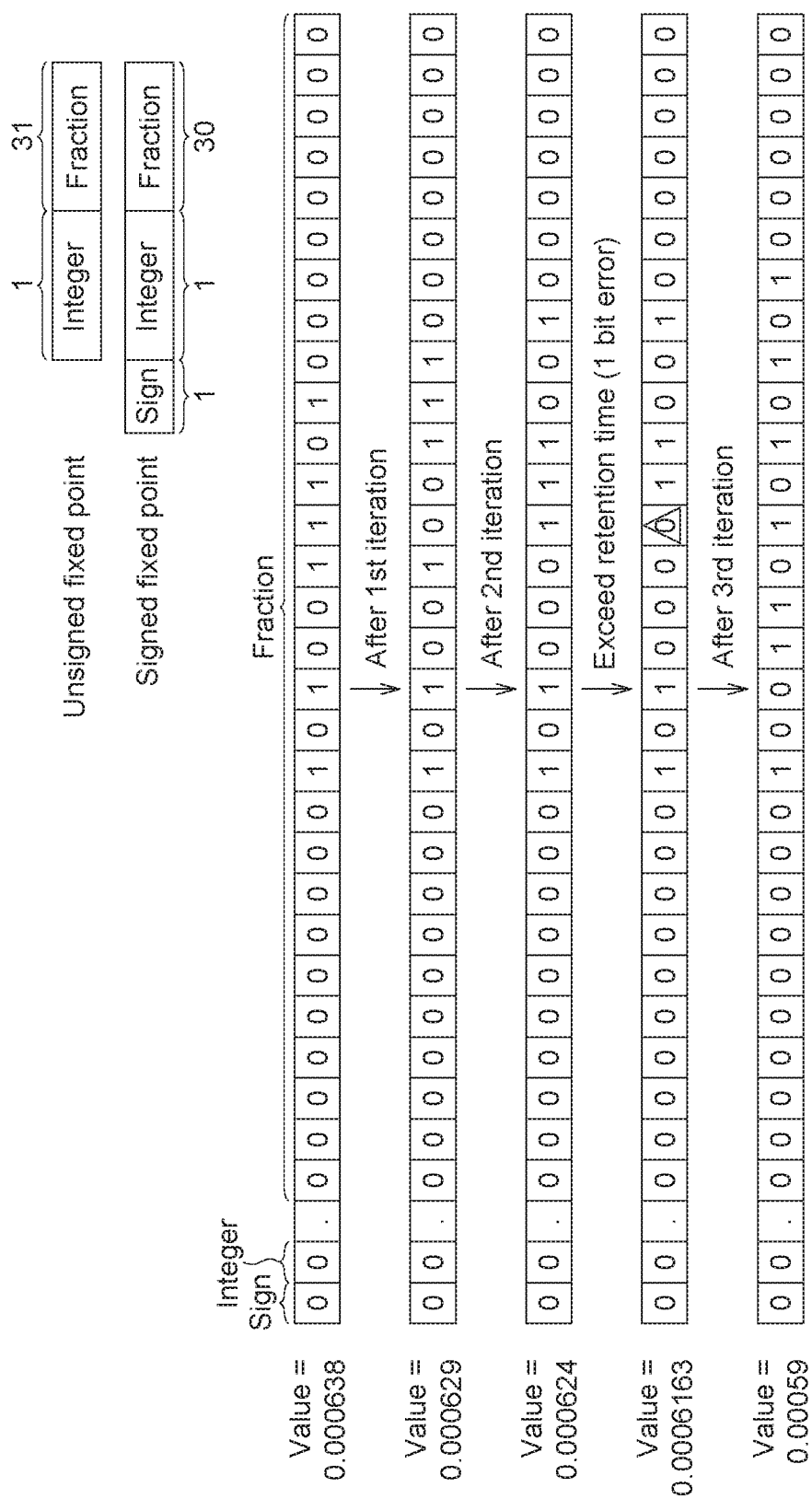

FIG. 5B shows fluctuation of bit which exceeds the retention time. At initial, the value of the 32-bit signed fixed point is 0.000638. After the first iteration, the value of the 32-bit signed fixed point is 0.000629. Similarly, after the second iteration, the value of the 32-bit signed fixed point is 0.000624. However, one LSB (for example bit 17) of the fraction bit is fluctuated due to exceeding of the retention time and thus the value of the 32-bit signed fixed point becomes 0.0006163. The fluctuated bit may be recovered in the following training iterations. After the third iteration, the value of the 32-bit signed fixed point is 0.00059. Thus, it is clear that even if the LSB of the fraction bit have fluctuation due to exceeding of the retention time, the value of the 32-bit signed fixed point before an error occurred is slightly different from the value of the 32-bit signed fixed point after the error occurred.

Thus, in one embodiment of the application, in writing WB into the memory cells of the WB, from the first iteration to the last iteration, the rapid set operation are performed on LSBs (or the less important bits) of the WB and the full set operations are performed on MSBs (or the important bits) of the WB.

With the support of Data-Comparison Write (DCW), the important bits of the WB are programmed only when the important bit(s) of the WB is/are changed. Also, LSBs (or the less important bits) of the WB are programmed by the rapid set operation or the reset operation every iteration.

In the last iteration, the full set operations are performed on the weights and biases for better retention time of the WB.

Also, the important bits of the WB are re-programmed (by the full set operation) when the bits need to be changed. The less important bits of the WB are re-programmed by the rapid set operation in every iteration of the training phase. By so, the above embodiment of the application may guarantee the correctness of important bits in weights and biases.

Figure 6:
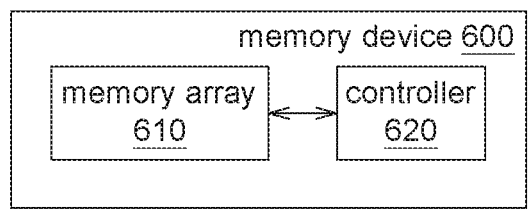
FIG. 6 shows a block diagram of a memory device according to one embodiment of the application.

FIG. 6 shows a block diagram of a memory device according to one embodiment of the application. As shown in FIG. 6, the memory device 600 includes a memory array 610 and a controller 620. The memory array 610 is used to implement the ANN or the NN. The controller 620 is coupled to the memory array 610. The controller 620 is configured to control programming operations on the memory array as the implementations described in the above embodiments of the application. In FIG. 6, the controller 620 is realized by internal circuits of the memory device 600, but the application is not limited by this. In other possible embodiments of the application, the controller may be implemented by an external controller, which is still within the scope and spirit of the application.

In embodiments of the application, in NN training, AM in neural networks may be programmed by the rapid set operations or the full set operation based on the computation duration of the data of the layer of the NN. Also, in NN training, Weights and Biases (WB) in neural networks may be programmed by the rapid set operations or the full set operation based on bit importance of WB wherein MSBs of WB have more importance than LSBs of WB.

Embodiments of the application disclose programming technology on NVM-based main memory architecture combining with neural network. Embodiments of the application may be applied to various non-volatile memories such as Phase Change memory (PCM), Resistive random-access memory (RRAM or ReRAM) or Magnetoresistive Random Access Memory (MRAM).

Also, embodiments of the application may be applied to memory type non-volatile memory devices or storage type non-volatile memory devices.

As described above, the rapid set implementation disclosed in the embodiments of the application may achieve high write performance, low energy consumption and long endurance improvement. In the embodiments of the application, the rapid set implementation used on neural networks may improve the characteristics as mentioned above with almost zero overhead. In the meantime, data precision remains unchanged.

In other possible embodiments of the application, to adaptively adjust the program pulse time of the rapid set operations may introduce different degree of improvement.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A memory device including:
   a memory array used for implementing neural networks (NN), the NN including a plurality of layers; and
   a controller coupled to the memory array, the controller being configured for:
   determining a computation duration of a first data of a first layer of the plurality of layers;
   selecting a first program operation if the computation duration of the first data of the first layer is shorter than a threshold; and
   selecting a second program operation if the computation duration of the first data of the first layer is longer than the threshold, wherein the second program operation has a longer program pulse time than the first program operation.

2. The memory device according to claim 1, wherein the first data includes activation maps.

3. The memory device according to claim 1, wherein if the computation duration of the first data of the first layer is shorter than the threshold, a first retention time achieved by the first program operation is longer than the computation duration of the first data.

4. The memory device according to claim 1, wherein if the computation duration of the first data of the first layer is longer than the threshold, a second retention time achieved by the second program operation is longer than the computation duration of the first data.

5. The memory device according to claim 1, wherein
an activation maps (AM) computation duration (CD) array is used to record a respective maximum computation duration of each layer of the plurality of layers;
the AM CD array is updated in each of a plurality of iterations in a training phase; and
in a first iteration of a training phase, computation durations of all activation maps in the plurality of layers are obtained.

6. A memory device including:
a memory array used for implementing neural networks (NN), the NN including a plurality of layers; and
a controller coupled to the memory array, the controller being configured for:
determining a computation duration of a first data of a first layer of the plurality of layers;
selecting a first program operation if the computation duration of the first data of the first layer is shorter than a threshold; and
periodically refreshing the first data of the first layer by the first program operation if the computation duration of the first data of the first layer is longer than the threshold.

7. The memory device according to claim 6, wherein the first data includes activation maps.

8. The memory device according to claim 6, wherein if the computation duration of the first data of the first layer is shorter than the threshold, a first retention time achieved by the first program operation is longer than the computation duration of the first data.

9. The memory device according to claim 6, wherein if the computation duration of the first data of the first layer is longer than the threshold, a second retention time achieved by periodically refreshing the first data of the first layer by the first program operation is longer than the computation duration of the first data.

10. The memory device according to claim 6, wherein
an activation maps (AM) computation duration (CD) array is used to record a respective maximum computation duration of each layer of the plurality of layers;
the AM CD array is updated in each of a plurality of iterations in a training phase; and
in a first iteration of a training phase, computation durations of all activation maps in the plurality of layers are obtained.

11. A memory device including:
a memory array used for implementing neural networks (NN), the NN including a plurality of layers; and
a controller coupled to the memory array, the controller being configured for:
selecting and performing a first program operation on a first group of a first data of a first layer of the plurality of layers; and
selecting and performing a second program operation on a second group of the first data,
wherein the first program operation has a program pulse time longer than the second program operation; and
the first group of the first data has bit importance higher than the second group of the first data.

12. The memory device according to claim 11, wherein the first data includes weights and biases.

13. The memory device according to claim 11, wherein the first group of the first data is programmed by the first program operation having a longest program pulse time among a plurality of program operations and the second group of the first data is programmed by the second program operation having a shortest program pulse time among the plurality of program operations.

14. The memory device according to claim 11, wherein
the first group of the first data is re-programed when the first group of the first data is changed;
the second group of the first data is re-programmed by the second program operation in every iteration of a training phase; and
in a last iteration of the training phase, the first program operation is performed on the first group of the second type of data and on the second group of the second type of data.

15. The memory device according to claim 11, wherein when the first data is a floating point, the first group of the first data includes a sign bit, exponent bits and Most Significant Bits (MSB) of mantissa bits of the floating point, and the second group of the first data includes Least Significant Bits (LSB) of the mantissa bits of the floating point.

16. The memory device according to claim 11, wherein when the first data is a signed fixed point, the first group of the first data includes a sign bit, an integer bit and Most Significant Bits (MSB) of fraction bits of the signed fixed point, and the second group of the first data includes Least Significant Bits (LSB) of the fraction bits of the signed fixed point.

17. The memory device according to claim 11, wherein when the first data is an unsigned fixed point, the first group of the first data includes an integer bit and Most Significant Bits (MSB) of fraction bits of the unsigned fixed point, and the second group of the first data includes Least Significant Bits (LSB) of the fraction bits of the unsigned fixed point.

* * * * *